May 6, 1941.　　A. T. KING ET AL　　2,240,560
VALVE
Filed Oct. 2, 1939
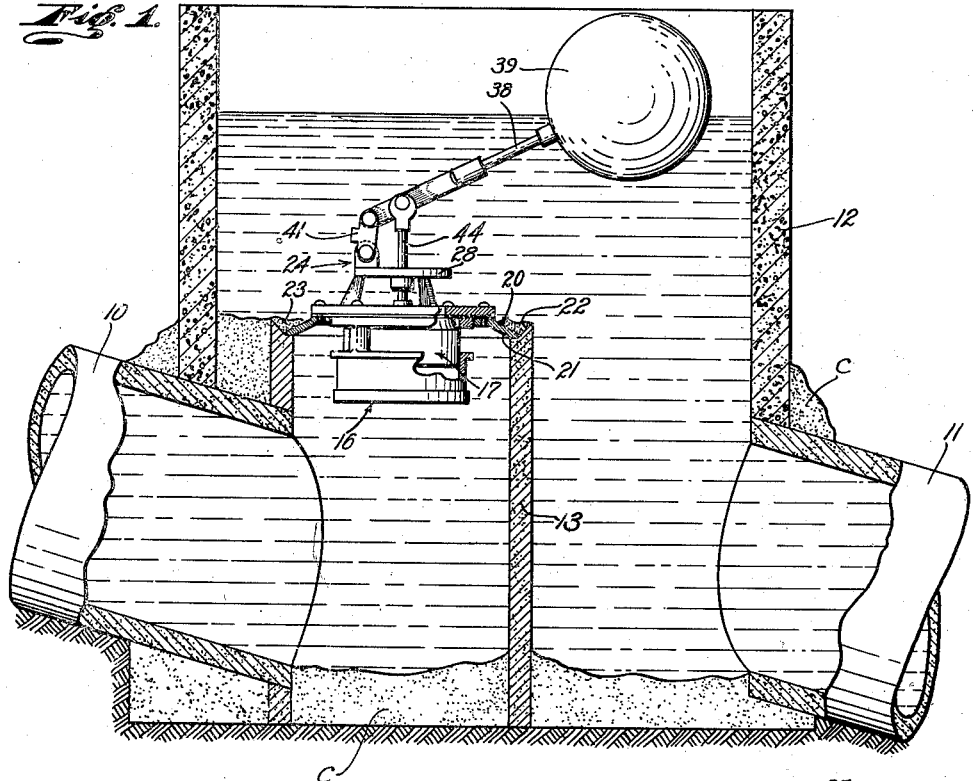
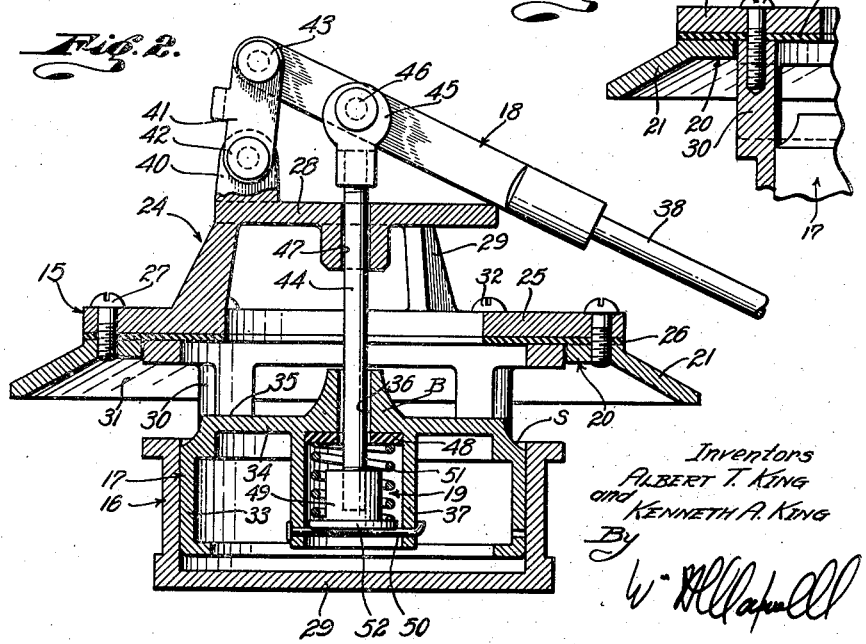
Inventors
ALBERT T. KING
and KENNETH A. KING
By
Their Attorney Patented May 6, 1941

2,240,560

UNITED STATES PATENT OFFICE 2,240,560

VALVE

Albert T. King and Kenneth A. King, Orange, Calif.

Application October 2, 1939, Serial No. 297,497

11 Claims. (Cl. 137—104)

This invention relates to valves and relates more particularly to valves for maintaining a constant head or pressure in lines such as the laterals of irrigation systems. A general object of this invention is to provide a valve of the class referred to that is particularly effective and that is simple and inexpensive to manufacture.

In irrigation systems in hilly country difficulty is experienced in maintaining a uniform pressure in the main lines and the laterals which are fed by the main lines. Tall overflow stands are often installed at the high ends of the laterals to provide the desired head in the laterals, and similar tall stands are sometimes required at points along the main lines. Manual valves are often employed to maintain the desired head but such valves require attention and manual operation each time there is a change in supply head or discharge rate. Conventional regulator valves may be used to control the head of water in such systems, but such valves are so costly and complicated that they are impractical and are rarely used. The pipes of irrigation systems are often constructed of cement, or the like, and therefore are easily fractured by shock such as accompanies water hammer. Many valves and systems now used cause water hammer that fractures the pipes, necessitating expensive replacements and repair.

Another object of this invention is to provide a valve that is operable to maintain a substantially uniform head or pressure in a fluid line such as a lateral feeder of an irrigation system, without chattering and without producing water hammer.

Another object of this invention is to provide a valve of the character mentioned that is entirely automatic in operation, making the presence of an attendant or operator unnecessary.

Another object of this invention is to provide a valve of the character mentioned that is extremely simple and inexpensive to manufacture and install. The improved valve of the present invention does not include a large or costly metal body such as is found in most valves. It is a feature of the invention that the working parts of the valve may be set directly in cement, to become operative in a pipe or line part.

Another object of this invention is to provide a valve of the character mentioned embodying a novel, very effective means for producing a pressure balancing bleeding action through the valve at the initiation of each opening movement and a novel means for absorbing or preventing shock at the end of each closing movement.

A further object of this invention is to provide a valve of the character mentioned that is small and compact and, therefore, suitable for installation in a limited space.

The various objects and features of our invention will be fully understood from the following detailed description of a typical, preferred form and application of the invention, throughout which description reference is made to the accompanying drawing, in which:

Fig. 1 is a vertical detailed sectional view of a portion of an irrigation system showing the valve of the present invention installed therein and in the fully open position. Fig. 2 is an enlarged vertical detailed sectional view of the principal parts of the valve with the piston valve in the fully open position, and Fig. 3 is a fragmentary vertical detailed sectional view of the supporting means.

The valve of the present invention may, of course, be employed in numerous situations and may perform various functions. In the following detailed description we will describe a typical preferred embodiment of the invention installed in a part of a more or less conventional irrigation system to control the delivery of water to a feeder lateral. It is to be understood that the invention is not to be construed as limited or restricted to the particular form or application of the invention herein described, but is to be taken as including any features or modifications that may fall within the scope of the claims.

The portion of the irrigation system illustrated in Fig. 1 comprises what we will term a supply line 10 and an outlet line 11. The line 11 may be considered as a feeder lateral for supplying water to a plurality of valved outlets. The lines 10 and 11 are inclined and a substantially vertical stand pipe or stand 12 is interposed between the low end of the line 10 and the high end of the line 11. The stand 12 is a tubular element of substantial diameter open at its upper end for water overflow and inspection purposes and closed at its lower end. A block or body of cement C, or the like, closes the lower end of the stand 12 and secures the adjacent end portions of the lines 10 and 11 in the correct relation with the stand. The line 11 may have direct communication with the lower portion of the stand 12 while the discharge end of the line 10 has a vertical branch or pipe arm 13 within the stand 12. The pipe arm 13 is arranged in spaced adjacent relation to the wall of the stand 12 and is considerably smaller in diameter than the stand. The lower end of the arm 13 is set in and closed by the body of cement C. The valve of the invention controls communication between the upper end of the pipe line arm 13 and the interior of the stand 12.

The valve of the invention may be said to comprise, generally, a mounting or supporting means 15 for application to the upper end of the pipe arm 13, a cylinder 16 carried by the supporting means 15, a piston valve 17 operable in the cylinder 16 and adapted to seal with the means 15 to close off the pipe arm 13, a float and lever means 18 for operating the piston valve 17 and a novel connection 19 between the means 18 and the piston valve 17.

The mounting or supporting means 15 carries the various other elements of the valve and is adapted for installation on the upper end of the conduit part or arm 13. The means 15 is characterized by its simplicity and low cost and by the fact that it replaces and makes unnecessary the costly valve body employed in most valves. The means 15 comprises an annular base element which we will term a flange 20. The upper part of the flange 20 is flat and horizontal and the flange is in the form of a downwardly and outwardly sloping lip 21. The lower edge portion of the lip 21 is adapted to rest on the upper end of the pipe arm 13. In the case illustrated in Fig. 1 the upper end of the pipe arm 13 has a suitably shaped socket 22 in which the lip seats. Cement 23 or other suitable material is provided in the socket 22 to secure the flange lip 21 to the pipe arm 13 and to provide a seal between the arm and the flange lip.

The supporting means 15 further includes a bracket 24 carried by the flange 20. The bracket 24 has an annular horizontal flange or base rim 25 overlying the upper horizontal part of the flange 20. A gasket 26 of hydraulic packing resistant to the action of the fluid handled is interposed between the opposing surfaces of the flange 20 and the bracket rim 25. Screws 27 pass through openings in the rim 25 and are screwed into openings in the flange 20 to secure the bracket 24 to the flange. The gasket 26 continues inwardly beyond the annular upper portion of the flange 20 to form a downwardly facing sealing element or seat for the piston valve 17. It will be noted that the annular opening in the bracket rim 25 is adapted to communicate with the interior of the pipe arm 13 and the interior of the stand 12. The bracket 24 further includes an elevated platform 28 supported on the rim 25 by spaced legs or webs 29. The platform 28 carries elements of the lever and float means 18 as will be subsequently described. The flange 20 and the bracket 24 are formed of brass, bronze, or other material that is substantially unaffected by the water or fluid handled. It is to be particularly noted that the supporting means 15 that replaces the customary valve body is very simple and inexpensive to manufacture and is readily mounted on the pipe part or arm 13.

The cylinder 16 is suspended from the supporting means 15 and carries or receives the piston valve 17. The cylinder 16 is open at its upper end to receive the valve 17 and is closed at its lower end by an imperforate wall 29. In the preferred construction the cylinder 16 is spaced below the supporting means 15. The means for suspending the cylinder 16 in spaced relation to the supporting means 15 includes a series of circumferentially spaced webs 30 projecting from the upper end of the cylinder 16 and joined at their upper end by a ring 31. The ring 31 bears upwardly against the gasket 26 within the flange 20 and is secured to the rim 25 of the bracket 24 by screws 32. The webs 30 and the ring 31 may be integral with the cylinder 16. The cylinder 16 may be a simple, one piece casting of brass, or the like.

The piston valve 17 is the main closure element of the device, being operable to seal against the gasket 26 to close off the upper end of the pipe line arm 13. The piston 17 is a cylindrical member having a cylindrical side wall 33 and an upper wall or head 34. The side wall 33 slidably cooperates with the internal surface of the cylinder 16. The head 34 of the valve 17 has a flat finished upper surface 35 for sealing with the gasket 26. In accordance with the invention the upper outer corner of the piston valve 17 is preferably cut away to provide an upwardly facing annular shoulder S. Where the surface 35 is in sealing engagement with the gasket 26 the shoulder S is exposed to the action of the pressure in the pipe arm 13 which pressure tends to open the valve 17. The valve 17 provided with the shoulder S has the form and action of a differential piston. A tapered central fluid deflecting boss B is provided on the upper end of the valve 17. A central vertical opening 36 is provided in the upper wall or head 34 of the piston valve 17 and passes through the boss B. The opening 36 is controlled by the means or connection 19 as will be later described and serves to put the interior of the cylinder 16 in communication with the pipe arm 13 or the stand 12. A tubular wall 37 depends from the valve head 34 in surrounding concentric relation with the opening 36.

The float and lever means 18 operates the valve 17 between its open and closed positions in response to variations in the level of the water in the stand 12 which reflect the head of the fluid in the line 11. The means 18 includes a float lever 38 provided at its outer end with a buoyant element or float 39. The lever 38 is pivoted at its inner end to the platform 28 so that the float 39 rising and falling in response to variations in the water level in the stand 12 pivots the lever up and down. A lug 40 projects upwardly from the platform 28 and a split link 41 has its lower end connected with the lug 40 by a pivot pin 42. The inner part of the float lever 38 is flat sided and is received in the upper portion of the split link 41. A pivot pin 43 pivotally connects the inner end of the lever 38 with the link 41. The means 18 further includes a link 44 depending from the lever 38. A yoke 45 is screwed or otherwise fixed on the upper end of the link 44 and a pivot pin 46 connects the yoke 45 with the float lever 38 so that the lever operates the link 44. The link 44 passes downwardly through a guide opening 47 in the platform 28 and continues downwardly through the opening 36 in the valve head 35. The link 44 passes through the opening 36 with considerable clearance leaving an annulus for the free flow of fluid. While we have shown the operating float 39 secured to the lever 38 it is to be understood that the lever 38 is not essential in every installation and in some cases the float 39 may be secured directly to the upper end of the stem or link 44.

The connection 19 serves to operatively connect the link 44 with the piston valve 17 and to govern fluid flow through the opening 36. The connection 19 includes a sealing washer 48 lying against the under surface of the valve head 35 within the wall 37 and in surrounding relation to the opening 36. The washer 48 is formed of hydraulic packing or other material unaffected by the fluid handled. The connection 19 further includes a valve part 49 screwed to or otherwise fixed on the lower end of the link 44 to operate within the wall 37 with clearance. The upper end of the valve part 49 is adapted to seal with the washer 48 to close off the opening 36 and thus close off communication of the cylinder 16 with the pipe arm 13 and the stand. The cooperation of the valve part 49 with the washer 48 may transmit movement from the link 44 to the piston valve 17 and with the valve head 35 in cooperation with the gasket 26 the engagement of the part 49 with the washer 48 limits upward movement of the link 44, the lever 38 and the float 39. A bar or rod 50 is arranged in transverse openings in the lower portion of the wall 37 and is engageable by the lower end of the valve part 49 so that downward movement may be transmitted from the link 44 to the piston valve 17.

The valve part 49 and the washer 48 and the rod 50 engaged thereby form a slack connection between the float operated link 44 and the piston valve 17. In the construction illustrated this slack connection is spring loaded to yieldingly resist or retard movement of the valve part 49 toward the washer 48 although other means may be provided for this purpose if desired. A coiled spring 51 is shown arranged under compression between the washer 48 and a flange 52 on the lower end of the valve part 49. The spring 51 services to urge the valve part 49 and the link 44 downwardly with respect to the piston valve 17. The valve 17 and the various elements of the means 18 and the connection 19 are formed of brass or other material unaffected by the water or fluid handled.

In operation it will be assumed that the line 10 is delivering water to the lateral line 11 and that the valved outlets of the line 11 are open. Under normal operating conditions when there is a correct head or pressure in the line 11 the fluid level in the stand 12 maintains the float 39 in a position where the piston valve 17 is open. In practice the piston valve 17 may be in an intermediate open position when the desired pressure or head is in the line 11. When the pressure or head in the line 11 increases due to closing of certain of the outlets or due to an increase in the head of the fluid delivered by the line 10 the water level in the stand 12 rises. When this occurs the float 39 pivots the lever 38 upwardly and the link 44 moves upwardly. This movement continues until the piston valve 17 is closed. The spring 51 forms a force transmitting element which transmits the upward movement from the link 44 to the piston valve 17 and the spring may yield during the closing movement of the piston valve 17 so that the valve part 49 approaches the washer 48. The boss B around the opening 36 deflects or directs the fluid upwardly in such a manner that the resultant flow draws or induces fluid upwardly through the opening from the interior of the cylinder 16. This reduces the fluid pressure in the cylinder. The suction or upward induction of fluid from the interior of the cylinder 16, resulting from the directing or deflecting of the fluid by the boss B, is accompanied by a reaction, namely an increase in the pressure acting downwardly on the upper end of the piston valve 17. This increased pressure is counter to the force exerted by the float means 18 and tends to lessen the rate of closing of the valve and steady the closing action. The fluid pressure acting on the shoulder S is higher than the pressure in the cylinder and the force imposed on the shoulder S is counter to the valve closing force exerted by the float 39. This counter fluid pressure acting on the shoulder S resists the tendency of the valve 17 to suddenly jar closed as it approaches the closed position, and the piston valve 17 moves into sealing engagement with the gasket 26 without jarring, chattering or hammering. Immediately following the closing of the piston valve 17 the valve part 49 comes into sealing engagement with the washer 48 to close the opening 36.

With the surface 35 of the valve 17 in sealing cooperation with the gasket 26 water is prevented from flowing from the pipe line arm 13 into the stand 12 and where one or more outlets of the line 11 are open the water level in the stand 12 lowers. As the water level in the stand 12 lowers the lever 38 and the link 44 move downwardly. At the start of the downward movement of the link 44 the valve part 49 moves away from the washer 48 to uncover the opening 36. The spring 51 may aid the opening action of the valve part 49. With the opening 36 open the pressure at the opposite sides of the piston valve is that of the head in the stand 12 and the valve 17 is "floating" or balanced except for the fluid pressure in the pipe arm 13 acting on the shoulder S. The fluid pressure on the shoulder S assists the float 39 in opening the valve 17, and the piston valve readily moves downwardly with the link 44. Downward movement of the piston valve 17 moves the face 35 away from the gasket 26 so that water is again permitted to flow from the arm 13 into the stand 12. The valve operates as above to maintain a substantially constant water level in the stand 12 and, therefore, a substantially uniform head in the line 11.

The flow directing boss B and the fluid pressure shoulder S of the piston valve 17 co-act and are related to reduce or prevent sudden movement and shock during the final portions of the valve movements. In practice the valve of the invention operates smoothly and effectively for an indefinite period without producing a water hammer action or chattering in the line. The device or valve is compact to be installed in a stand of small diameter and is easily and quickly mounted and sealed in place in practically any situation.

Having described only a typical preferred form and application of our invention, we do not wish to be limited or restricted to the specific details herein set forth, but wish to reserve to ourselves any variations or modifications that may appear to those skilled in the art or fall within the scope of the following claims.

Having described our invention, we claim:

1. Valve means for use in connection with a pipe part delivering liquid to a chamber having an outlet, the valve means comprising a mounting flange for application to the pipe part, a supporting bracket above the flange, a sealing gasket between the flange and bracket having an exposed part, a cylinder suspended from the bracket to be below the flange and within the pipe part, a piston valve movable in the cylinder and cooperable with the exposed part of the gasket to close off flow from said pipe part, and float means supported on the bracket responsive to the level in said chamber to operate the valve.

2. Valve means for use in connection with a pipe part delivering liquid to a chamber having an outlet, the valve means comprising a mounting flange for application to the discharge end of the pipe part, a supporting bracket overlying the flange, a gasket between the flange and bracket having an exposed portion, a cylinder within the pipe part, a perforated web on the upper end of the cylinder engaging against a part of said exposed gasket portion, means attaching the web to the bracket to suspend the cylinder in the pipe part, a piston valve operable in the cylinder and adapted to seal with said portion of the gasket to close off the pipe part, and means carried by the bracket responsive to the liquid level in the chamber to operate the valve.

3. Valve means for use in connection with a pipe part delivering liquid to a chamber having an outlet, the valve means comprising a mounting flange for application to the discharge end of the pipe part, a supporting bracket overlying the flange, a gasket between the flange and bracket having an exposed portion, a cylinder suspended from the bracket to lie within the pipe part and to have its upper end engage the gasket, a piston valve operable in the cylinder and adapted to seal with said portion of the gasket to close off the pipe part, float means carried by the bracket and responsive to the liquid level in the chamber to operate the valve, and a spring loaded slack connection between the float means and the valve.

4. Valve means for use in connection with a pipe part delivering liquid to a chamber having an outlet, the valve means comprising a supporting means for application to said pipe part, a cylinder carried by the supporting means, a valve seat on the supporting means, a piston valve operable in the cylinder and cooperable with the seat to stop the flow from the pipe part, float means carried by the supporting means responsive to the liquid level in the chamber to open and close the valve, the piston having a port placing the cylinder in communication with the pipe part, a surface on the piston directing the fluid flowing past the valve to induce fluid out through said port as the valve closes to reduce the pressure in the cylinder, and a surface on the valve exposed to the pressure in the pipe part and opposing the seat so that the fluid pressure acting on the last mentioned surface as the valve closes is counter to the force exerted on the valve by the float to prevent the valve from hammering closed.

5. Valve means for use in connection with a pipe part delivering liquid to a chamber having an outlet, the valve means comprising a supporting means for application to said pipe part, a cylinder carried by the supporting means, a valve seat on the supporting means, a piston valve operable in the cylinder and cooperable with the seat to stop the flow from the pipe part, operating means carried by the supporting means and responsive to the liquid level in the chamber, a slack connection between the operating means and the valve, there being a port for putting the cylinder in communication with the pipe part to equalize the pressure on the opposite sides of the valve, means on the valve for causing a reduction in pressure in the cylinder as the valve closes, and a surface on the valve exposed to the pressure in the pipe part and opposing the seat so that fluid pressure acting on the surface as the valve closes is counter to the force exerted on the valve by the operating means to retard the final closing movement of the valve.

6. Valve means for use in connection with a pipe part delivering liquid to a chamber having an outlet, the valve means comprising a supporting means for application to said pipe part, a cylinder carried by the supporting means, a valve seat on the supporting means, a piston valve operable in the cylinder and cooperable with the seat to stop the flow from the pipe part, float means carried by the supporting means responsive to the liquid level in the chamber, the piston having a port for placing the cylinder in communication with the pipe part, operating means carried by the supporting means responsive to the liquid level in the chamber including a movable operating member for moving the valve and having limited movement relative to the valve, a flow deflector on the valve causing the fluid moving past the valve to draw fluid from the port as the valve closes, a surface on the valve opposing the seat and acted on by the pressure in the pipe part so that said pressure is counter to the valve closing force exerted by the operating means to prevent hammering of the valve, and a valve part on said member closing said port when the valve is in the closed position against the seat and moved away from said port when the member begins moving in a direction to open the valve.

7. Valve means for use in connection with a pipe part delivering liquid to a chamber having an outlet, the valve means comprising a supporting means for application to said pipe part, a cylinder carried by the supporting means, a valve seat on the supporting means, a piston valve operable in the cylinder and cooperable with the seat to stop the flow from the pipe part, float means carried by the supporting means responsive to the liquid level in the chamber, the piston having a port for placing the cylinder in communication with the pipe part, operating means carried by the supporting means responsive to the liquid level in the chamber including a movable operating member for moving the valve and having limited movement relative to the valve, a flow deflector on the valve causing the fluid moving past the valve to draw fluid from the port as the valve closes, a surface on the valve opposing the seat and acted on by the pressure in the pipe part so that said pressure is counter to the valve closing force exerted by the operating means to prevent hammering of the valve, a valve part on said member closing said port when the valve is in the closed position against the seat and moved away from said port when the member begins moving in a direction to open the valve, and spring means for aiding said movement of the valve part.

8. Valve means for use in connection with a pipe part delivering liquid to a chamber having an outlet, the valve means comprising a supporting means for application to said pipe part, a cylinder carried by the supporting means, a valve seat on the supporting means, a piston valve operable in the cylinder and cooperable with the seat to stop the flow from the pipe part, the valve having a port placing the cylinder in communication with the pipe part, float means actuated by changes in the liquid level in the chamber to operate the valve, the float means including a movable operating member passing through the port, a flow deflector on the valve causing the fluid moving past the valve to draw fluid from the port as the valve closes, a surface on the valve opposing the seat and acted on by the pressure in the pipe part so that said pressure is counter to the valve closing force exerted by the operating means to prevent hammering of the valve, a valve part on said member opposing the port and closing the port when the valve is in the closed position against the seat, the said member and valve part having limited movement relative to the valve whereby said part moves away from the port when the member begins to move in a direction to open the valve, and a spring acting between the valve and said part urging the said part away from the port.

9. Valve means for application to the upper end of a supply pipe discharging into a stand pipe of an irrigation system, the valve means comprising an annular base to be secured to said end of the pipe, a valve seat on the base, a cylinder depending from the base to extend into the pipe, the lower end of the cylinder being closed, a piston valve operable in the cylinder and adapted to move upwardly through the upper end of the cylinder to cooperate with the seat, there being a port in the upper end of the valve for putting the cylinder in communication with the pipe, a float and lever mechanism supported on the base for operating the valve and including an operating member extending downwardly through said port, a flow deflector on the valve causing the fluid moving past the valve to draw fluid from the port as the valve closes, a surface on the valve opposing the seat and acted on by the pressure in the pipe part so that said pressure is counter to the valve closing force exerted by the operating means to prevent hammering of the valve, and a slack connection between said member and the valve whereby the member may move the valve into and out of cooperation with the seat, the slack connection including a part on the member engageable with the valve to control said port.

10. Valve means for application to the upper end of a supply pipe discharging into a stand pipe of an irrigation system, the valve means comprising an annular base to be secured to said end of the pipe, a valve seat on the base, a cylinder depending from the base to extend into the pipe, the lower end of the cylinder being closed, a piston valve operable in the cylinder and adapted to move upwardly through the upper end of the cylinder to cooperate with the seat, there being a port in the upper end of the valve for putting the cylinder in communication with the pipe, a float and lever mechanism supported on the base for operating the valve and including an operating member extending downwardly through said port, a slack connection between said member and the valve whereby the member may move the valve into and out of cooperation with the seat, the slack connection including two spaced elements on the valve, one a washer around the port, and a part on said member movable between said elements, the engagement of the part with the washer closing said port when the valve is closed, a flow directing boss on the upper end of the valve around the port causing the fluid flow to induce fluid from the cylinder as the valve closes, and an upwardly facing shoulder on the valve acted on by the pressure in the pipe so that said pressure prevents sudden closing of the valve.

11. Valve means for application to the upper end of a supply pipe discharging into a stand pipe of an irrigation system, the valve means comprising an annular base to be secured to said end of the pipe, a valve seat on the base, a cylinder depending from the base to extend into the pipe, the lower end of the cylinder being closed, a piston valve operable in the cylinder and adapted to move upwardly through the upper end of the cylinder to cooperate with the seat, there being a port in the upper end of the valve for putting the cylinder in communication with the pipe, a float and lever mechanism supported on the base for operating the valve and including an operating member extending downwardly through said port, a slack spring loaded connection between said member and the valve whereby the member may move the valve into and out of cooperation with the seat, the slack connection including two spaced elements on the valve, one a washer around the port, a part on said member movable between said elements, the engagement of the part with the washer closing said port when the valve is closed, and a spring under compression between the washer and said part, a flow directing boss on the upper end of the valve around the port causing the fluid flow to induce fluid from the cylinder as the valve closes, and an upwardly facing shoulder on the valve acted on by the pressure in the pipe so that said pressure prevents sudden closing of the valve.

ALBERT T. KING.
KENNETH A. KING.